A. PAPINI.
FAUCET CLAMP.
APPLICATION FILED MAR. 8, 1920.
1,380,923.
Patented June 7, 1921.
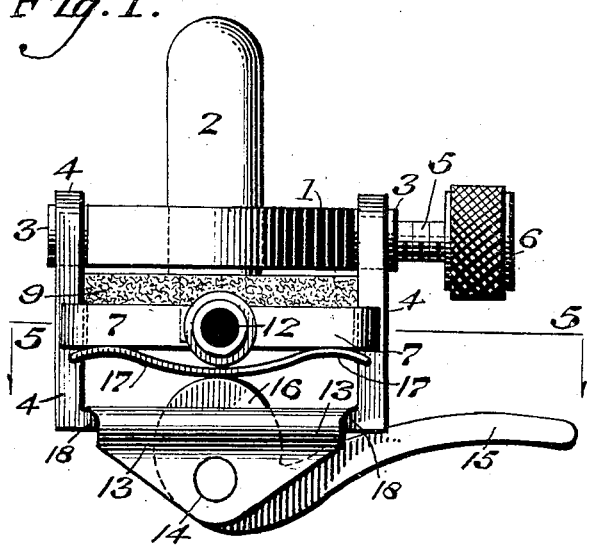
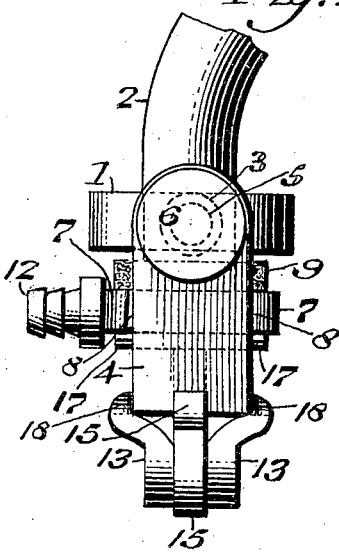
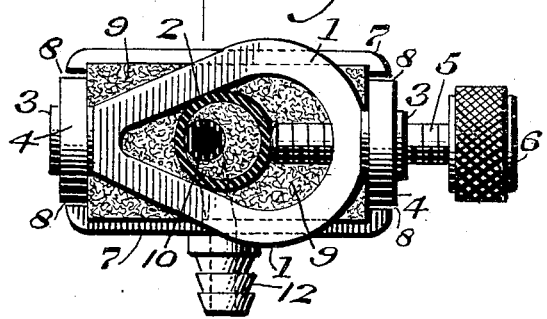
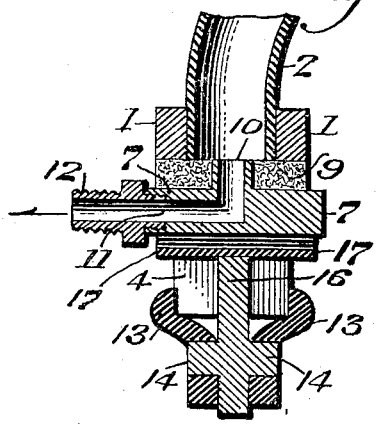
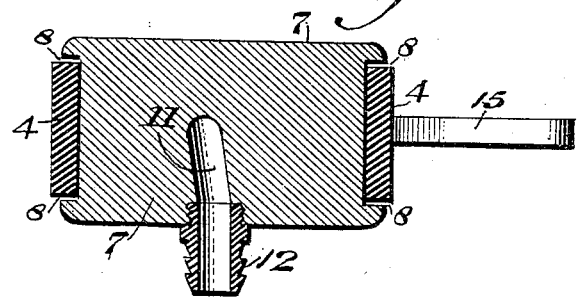

UNITED STATES PATENT OFFICE.

ANTONIO PAPINI, OF PHILADELPHIA, PENNSYLVANIA, ASSIGNOR TO A. MECKY COMPANY, OF PHILADELPHIA, PENNSYLVANIA, A CORPORATION OF PENNSYLVANIA.

FAUCET-CLAMP.

1,380,923.  Specification of Letters Patent.  Patented June 7, 1921.

Application filed March 8, 1920. Serial No. 363,992.

*To all whom it may concern:*

Be it known that I, ANTONIO PAPINI, a subject of the King of Italy, having resided in the United States one year last past and having declared my intentions of becoming a citizen thereof, residing in the city and county of Philadelphia, State of Pennsylvania, have invented a new and useful Faucet-Clamp, of which the following is a specification.

My invention consists of a clamp adapted to be connected with the faucet, spigot, cock, etc., of a fluid supply for directing the fluid to a heater or other article of service or place, said clamp being adapted to have attached to it a hose or other conductor which extends to the inlet of said heater or article, the members of said clamp and the operation thereof being hereinafter described, and the novel features thereof pointed out in the claims that follow the specification.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a front elevation of a clamp embodying my invention.

Fig. 2 represents a side elevation thereof.

Fig. 3 represents a top or plan view thereof.

Fig. 4 represents a vertical section on line 4—4 Fig. 3.

Fig. 5 represents a horizontal section on line 5—5 Fig. 1.

Similar numerals of reference indicate corresponding parts in the figures.

Referring to the drawings.

1 designates a yoke which is adapted to be fitted on the exterior of the faucet 2, it having on its opposite ends the collars 3 which are mounted freely in the ears 4 which depend from said collars and form the bearings for said yoke and allow it to be adjusted to the faucet. Through one of said collars is passed the screw 5 which is provided with a suitable head or button 6 for operating purposes, the point portion of said screw being adapted to engage the side of the faucet and to be tightened thereagainst, thus holding the yoke in adjusted position.

Fitted between the ears 4 is the vertically movable bed 7 whose sides have therein the recesses 8, whose walls engage freely the ears 4 whereby the bed is held in place and guided in its motions.

Supported on said bed 7 and retained between the ears 4 is the gasket 9 which is adapted to engage the mouth of the faucet and make a fluid tight joint therewith. In said gasket is an opening which is occupied by the branch 10 of the pipe 11, the latter occupying the bed 7 and having connected with it the outlet nipple 12 to which may be attached a hose or other conveyer for directing the water from the faucet to a place of service.

On the lower end of the ears 4 are the lugs 13 which depend therefrom and form the bearings for the axis 14 of the hand lever 15 which latter carries the eccentric head 16 which is adapted to bear against the bow spring 17 which in the present instance consists of a movable plate of resilient material interposed between said head and the bed 7 and is freely fitted to and guided by the ears 4.

It will be seen that when the yoke is adjusted on and secured to the faucet 2 and tightened in position by the screw 5, the lever 15 is operated whereby the bow spring 17 is pressed by the head 16 against the bed 7 and so the gasket or packing 9 is raised and presented to the mouth of the faucet and held resiliently but forcibly against the latter, forming a fluid tight joint therewith preventing leakage of the fluid at said mouth.

When the fluid is turned on it flows through the faucet, the branch 10, pipe 11 and nipple 12 and so is directed to the place of service. When the lever 15 is turned in opposite direction the spring and bed are released of the action of the head 16 whereby the bed and gasket lower from the mouth of the faucet. The screw 5 may then be operated whereby its point removes from the faucet whereby the device may be removed entirely from the latter.

The yoke 1 has its interior wall of tapering form whereby when it is drawn up by the screw 5 which is mounted in the crown of the yoke said wall tightens against the surface of the nozzle of the faucet, etc., with a wedging effect, and so takes firm hold of said surface without liability of the yoke to drop therefrom.

The ears 4 are connected at the bottom by a cross bar 18 which prevents said ears from spreading, and the lugs 13 are connected with said cross bar in any suitable manner, or may be, as in the present case, integral therewith.

The bow spring 17 causes the gasket or packing 9 to press resiliently against the mouth of the faucet and adapt it to yield to any inequalities of said mouth, so that the fluid tight joint required at said mouth is assured. Should there be any severe pressure in the faucet 2 or the member with which it is connected, said spring 17 will permit said gasket or packing 9 to yield at the mouth of the faucet, and so relieve such pressure and prevent bursting of the faucet or member with which it is connected.

Having thus described my invention what I claim as new and desire to secure by Letters Patent, is:—

1. In a clamp of the character stated, a yoke adapted to engage a fluid discharge member, a tightening device for said yoke a frame adapted to be supported on said yoke, a support for a gasket on said frame, a tightening lever on said frame adapted to operate said support and press said gasket against the mouth of said member, said lever having its bearings on said frame, and a resilient member secured to said frame for yieldingly retaining said gasket against the mouth of said fluid discharge member.

2. In a clamp of the character stated, a yoke attachable to a fluid discharge member, collars on said yoke, a frame rigidly secured to said collars and depending therefrom, a screw-like securing device adapted to be passed through a collar and the adjacent portion of said yoke and engage said fluid discharge member, a movable bed on said frame, a gasket on said bed adapted to engage the mouth of said fluid discharge member, and rigid and resilient means on said frame for pressing said bed and consequently said gasket against said mouth.

3. In a clamp of the character stated, a yoke attachable to a fluid dicharge member, a frame depending from said yoke, a screw-like securing device mounted on said yoke and adapted to engage said member, an eccentric lever mounted on said frame, a movable bed on said frame, and a gasket adapted to be supported on said bed and engage the mouth of said discharge member, the head of said lever being adapted to operate said bed to tighten said gasket in fluid tight position on said member.

4. In a clamp of the character stated, a yoke attachable to a fluid discharge member, a frame depending from said yoke, a screw-like securing device mounted on said yoke and adapted to engage said member, an eccentric lever mounted on said frame, a movable bed on said frame, a gasket adapted to be supported on said bed and engage the mouth of said discharge member, the head of said lever being adapted to operate said bed to tighten said gasket in fluid tight position on said member, and a resilient member interposed between said bed and the head of said lever.

5. In a clamp of the character stated, a yoke attachable to a fluid discharge member, a frame rigidly secured to and depending from said yoke, a movable bed on said frame, a gasket on said bed adapted to engage said fluid discharge member, an eccentric lever pivotally secured to said frame, and a bow spring interposed between said bed and the head of said lever.

ANTONIO PAPINI.

Witnesses:
JOHN A. WIEDERSHEIM,
N. BUSSINGER.